Hubert L. Naimer
INVENTOR.

BY Karl G. Ross
Attorney

United States Patent Office 3,467,583
Patented Sept. 16, 1969

3,467,583
PROCESS FOR MAKING A HOLLOW BODY WITH PROTECTIVE INNER LAYER FOR HIGH-TEMPERATURE APPLICATIONS
Hubert L. Naimer, Vienna, Austria, assignor to Camin Laboratories, Brooklyn, N.Y., a corporation of the United States of America
Filed May 16, 1966, Ser. No. 550,202
Int. Cl. C23b 7/02
U.S. Cl. 204—9                                   6 Claims

ABSTRACT OF THE DISCLOSURE

Method of making hollow bodies, e.g. rocket nozzles, wherein a mandrel of the shape conforming to the interior of the finished body is coated with a continuous ceramic layer to which is applied, by electrodeposition, an outer metallic shell.

Figure 1:
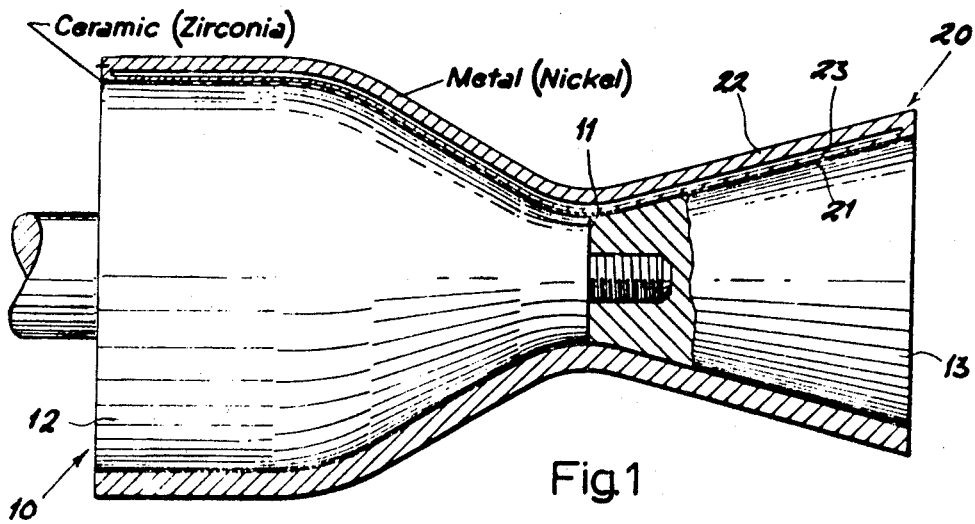

My present invention relates to a process for making hollow or tubular bodies having protective inner layers for high-temperature applications and, more particularly, to an improved process for making accurate bodies with considerable temperature resistance and adapted to be used as rocket components.

It is often desirable to have the interior of a tubular body lined with a layer having both high mechanical and excellent chemical resistance so as to withstand thermal and corrosion effects. In dealing with the nozzles, reaction chambers, control ducts and other components of a rocket, for example, the surfaces of the tubular body must be able to withstand the high temperatures of the rocket reaction, the corrosive influence of the reaction products and reacting compounds, and the considerable mechanical stress induced by the high-velocity flow of gases, etc. A corollary requirement is that the interior of the chamber or nozzle be accurately dimensioned so that undesirable thrust characteristics are avoided, and be uniform or smooth to bar gas-flow disturbances. In general, it has been found that the conventional methods of making hollow bodies of this type are unsatisfactory, not only because they cannot adequately be provided with coolant channels or the like when desired, but also because of some inherent characteristics of the manufacturing process. When such bodies have been manufactured by casting or molding and the refractory or vitreous layer is applied by dipping or spraying, it has been extremely difficult to maintain the inner surface completely uniform and smooth. Moreover, since the casting process usually imparts the desired tolerance to the inner surface of the body, the use of a coating along this surface, applied by spray nozzles, brushes or the like or even molded onto this surface, gives rise to impermissible dimensional fluctuations. Thus, where several tubes are to be axially aligned to form a flow channel, the irregularities of their inner surface layers will lead to objectionable discontinuities at the junctions. Where the hollow body must be precisely calibrated or of precise cross-section throughout, as in the case of rocket components, the nonuniformity of conventional lining processes has resulted in substantial difficulty, high rejection rates and considerable repair expense. In this connection, it may be noted that conventional processes provide for the application of the refractory coating only at the end of the forming process and that rejection of the pieces at this point is an extremely expensive consequence. It will be understood, further, that the application of refractory layers after the formation of the surrounding metallic shell has the additional disadvantage that the coating layers must have a limited thickness when they are applied by spray techniques in the usual manner. In fact, the least variation with respect to the tolerances of the pieces are obtained with the smallest spray thickness and increasing variation in thickness and in flow cross-section is observed with increasing thickness of the conventionally applied refractory layer. This is especially important when the body is used for rocket components or for volume, wave refraction or other measurements.

The general object of my present invention is to provide a simple and dependable process for making a hollow body having a smooth accurately dimensioned cavity lined with a protective layer of substantially any thickness without altering the tolerances of the cavity.

A further object of this invention is to provide an improved hollow body having a metallic shell, sheathing a refractory layer, which has a high degree of mechanical stability and resistance to thermal stress and is, therefore, highly amenable to use in rocket components.

Another object of this invention is to provide an improved rocket-thrust nozzle, combustion chamber or other rocket component having an accurately dimensioned cavity surrounded by a refractory material of relatively low thermal conductivity, sheathed in a layer of relatively high thermal conductivity without introducing substantial thermal stress factors.

According to a feature of the present invention, the protective lining is initially formed of a nonplatable refractory material about a mandrel corresponding in outer dimensions and configuration precisely to the configuration of the cavity to be formed in the body; thereafter, an outer metallic shell is electro-formed around this refractory layer and the mandrel removed so as to produce a metal-jacketed ceramic lining whose surface is highly smooth and free from any undesirable deformations by virtue of being shaped around a highly polished and precisely machined mandrel. While the protective layer, for the purposes of the present invention, is most advantageously a ceramic material of the type commonly used for the lining of rocket nozzles, combustion chambers and the like (e.g. zirconia) other ceramic materials, metalloceramic (cermet) compositions, high-melting metal/ oxide, metal carbides, oxides, silicates and the like and combinations thereof with titanium, tungsten or molybdenum and their oxides may be used. While the protective lining may be formed around the mandrel in a variety of ways, it has been found that best results are obtained when the ceramic or cermet is sprayed by plasma methods onto the surface of a highly polished and accurately machined mandrel. Powder and spray methods, pasting, baking, vapor deposition, dipping and brushing techniques are all basically suitable. Generally, even with refractory coatings that are predominantly or highly metallic, it is advantageous to form a conductive film on the coating carried by the mandrel, e.g. by means of a silver spray, before the metallic shell is electroformed around it.

It will be understood that the method of the present invention as broadly described is most suitable for the production of fluid-ducting bodies such as rocket nozzles, reaction chambers and the like because the inner cavity can be accurately dimensioned to close tolerances without special care merely by properly machining the mandrel. No concern need be had with reference to the thickness or uniformity of the coating, nor is it required that only a thin wall of refractory material be used. The dimensional accuracy is obtained in the first operation of the process, i.e. the application of the ceramic material to the mandrel, and not the last as was conventionally the case so that defects in the coating do not cause substantial losses.

Additionally, the finish produced along the inner surface of the body can be maintained as fine as desired and as uniform as required merely by polishing the surface of the mandrel and appropriately applying the ceramic layer. There is no problem of nonhomogeneous surface and the layer can be applied with a greater thickness and yet remain perfectly uniform. The method permits a single mandrel to be used to produce rocket components of different wall thickness and is highly effective for the production of relatively small-diameter nozzles and the like. Thus, while conventional systems require the insertion of a sprayhead or other tool to coat the wall of the nozzle (after formation of the metallic shell) with the ceramic material, the present invention merely applies the ceramic to the readily accessible periphery of a mandrel. Problems of access, as have plagued earlier systems, inability to evaluate the ceramic coating and the like are all avoided.

A further feature of this invention resides in the fact that the ceramic coating, prior to the application of the metallic shell thereto, can be evaluated by conventional non-destructive testing methods (e.g. X-ray) to ascertain its quality, uniformity and the presence or absence of flaws therein. When such testing methods are used for the ceramic coatings of earlier methods, it is found that the metallic shell either interferes with or completely prevents satisfactory testing.

According to a further feature of this invention, thermal stresses at the junction between the ceramic layer and the metallic layer are obviated through the use of gradated coatings which provide a transition between the innermost ceramic layer and the outermost metallic layer to preclude thermal shock. The intermediate layers may be either electroplated or plasma-deposited, depending upon the coating material, and those layers proximal to the innermost and outermost layers may include a significant fraction of the material constituting these layers to ensure a gradual transition. The metallic coating or sheet can, in in accordance with the present invention, be provided with cooling channels as set forth in U.S. Patent No. 3,022,230.

Figure 2:
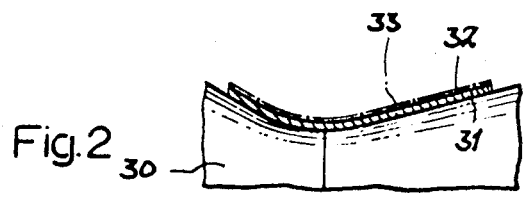
Figure 3:
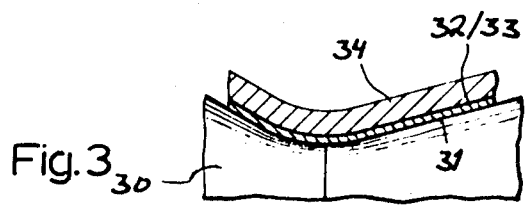
Figure 4:
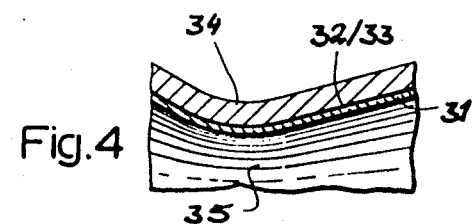

Other objects, features and advantages of the present invention will become more readily apparent from the following description, reference being made to the accompanying drawing in which:

FIG. 1 is an axial cross-sectional view through a rocket nozzle produced by the method of the present invention and shown prior to removal of the mandrel; and FIGS. 2-4 are fragmentary cross-sectional views showing successive stages in the production of a rocket nozzle in accordance with this invention.

In FIG. 1 of the drawing, I show a mandrel 10 which is joined axially at its central portion 11 from two outwardly flared mandrel portions 12 and 13 to enable these portions to be withdrawn independently from the hollow body to be formed. The hollow body 20 of FIG. 1 is a rocket nozzle and in the most general terms, can be formed in accordance with the invention by applying a ceramic layer of zirconia, thoria, titania or other refractory materials at 21 to the accurately machined outer surface of the mandrel 10. The application of the ceramic material may be by any conventional technique although plasma-spray deposition has been found to be most advantageous. Upon the ceramic layer 21, I then electrodeposit a metallic layer 22 (e.g. of nickel) which may be formed with grooves or channels 23 during the electroplating operation by the method fully described and illustrated in the above-mentioned patent. Thus, after rendering the ceramic layer 21 conductive by a spray of silver, a thin layer of nickel can be electrodeposited upon the ceramic layer and longitudinally extending fusible strips of nonconductive material can then be applied to the initial portion of the nickel coating in circumferentially spaced relationship. These strips are, as described in the patent, coated with a conductive film (e.g. of silver) and electrodeposition of nickel continued between the strips until electroplating material reaches the films upon the latter; continued electrodeposition closes the sheath around the strips which can be melted out, dissolved or otherwise removed to form the channel 23. The electrodeposition step can be effected by substantially any conventional nickel-deposition technique. For the purposes of the present invention, the nickel-plating bath can contain 300–450 gr. per liter of nickel sulfate, 45–26 gr. per liter nickel chloride, 35–40 gr. per liter boric acid and can be maintained at a pH of 3.2 to 4.5. Plating temperatures of 50° C. to 65° C. can be used with cathode current densities of, say, 4 to 8 amps./m.$^2$. The rocket nozzle produced in this manner is found to have a fine internal surface finish, a close adherence to the configuration, dimension and tolerance of the mandrel, a uniform ceramic layer and to be formed in a variety of sizes including diameters too small to be coated with ceramic material by conventional means. Advantageously, the ceramic layer may be about 20 mils in thickness. It will be understood, of course, that substantially any thickness of material can be used depending upon the thermal condition and the mechanical stress.

In FIGS. 2–4, I show successive steps in a process for making a rocket nozzle or chamber of the character described in which thermal shock phenomena can be reduced. Thus, the mandrel 30 is provided by plasma deposition with the nonconductive layer 31 (e.g. zirconia, thoria, titanium oxide, tungsten oxide, ceramic-metallic compositions or the like), a thin film of silver 32 being then applied. When a gradated coating is desired for reducing thermal-shock effects, I provide between the sheathing layer of metal and the ceramic layer, a transition layer represented at 33 in dot-dash lines. The transition layers have thermal conductivities intermediate that of the ceramic layer and of the sheathing layer and include, in succession, a layer of 70% zirconia, 30% nickel, followed by a layer of 30% zirconia and 70% nickel. In another arrangement, the layer proximal to the ceramic may contain 70% aluminum, 30% nickel while the next layer contains 30% aluminum, 70% nickel and receives the final nickel layer. In FIG. 3, I show an electroplated nickel layer 34 deposited on the preceding conductive layer 32 which may be a film for rendering the ceramic layer 31 conductive or a transition layer as described above. After removal of the mandrel 30 (FIG. 4), the inner surface 35 is found to be smooth, uniform and dimensionally precise.

It will be understood that the hollow body illustrated in the drawings and described above is represented of a large class of hollow structure lined internally with a protective layer. While the present improvement has its most significant advantages in rocket components and light fluid containing arrangements, it will be understood that the advantages gained by forming the ceramic layer first, may be applied in other types of bodies or systems. Furthermore, substantially all ceramic materials can be used while many of the plating materials proposed for the electroforming of bodies may be employed without material alteration of the plating process.

I claim:

1. A process for making a hollow body with an internal protective lining of a nonconductive vitreous ceramic material, comprising the steps of forming a mandrel conforming to the interior of said body, coating said mandrel with a substantially continuous layer of said nonconductive vitreous ceramic material, applying a conductive coating to said vitreous ceramic layer, electro-depositing an outer metallic shell on said conductive coating to bond said shell to said vitreous ceramic layer, and removing the mandrel from said layer of vitreous ceramic material.

2. The process defined in claim 1, further comprising the steps of electroforming channels at least in said metallic shell during the deposition of said shell on said conductive coating, said material being selected from the group which consists of zirconia, thoria, titanium oxide, tungsten oxide and cermets.

3. The process defined in claim 1 wherein said conductive coating forms a gradating layer between said shell and said vitreous ceramic layer for preventing the transmission of thermal shock therebetween, said material being selected from the group which consists of zirconia, thoria, titanium oxide, tungsten oxide and cermets.

4. The process defined in claim 1 wherein said vitreous ceramic material is applied to said mandrel by plasma deposition, said material being selected from the group which consists of zirconia, thoria, titanium oxide, tungsten oxide and cermets.

5. The process defined in claim 1 wherein said metallic shell is an electrodeposited nickel layer.

6. A process for making a hollow body in the form of rocket component with an internal protective lining of nonplatable material, comprising the steps of forming a mandrel conforming to the interior of said body, coating said mandrel with a substantially continuous layer of zirconia, applying a conductive coating to said layer, electro-depositing an outer metallic shell in the form of a nickel layer on said conductive coating to bond said shell to said layer, and removing the mandrel from said zirconia layer of nonplatable material.

References Cited

UNITED STATES PATENTS

| | | | |
|---|---|---|---|
| 875,281 | 12/1907 | McGregor | 204—38 |
| 1,063,417 | 6/1913 | Cook | 204—9 |
| 2,613,178 | 10/1952 | Grant | 204—9 |
| 2,990,601 | 7/1961 | Wagner | 264—80 |

JOHN H. MACK, Primary Examiner

T. TUFARIELLO, Assistant Examiner

U.S. Cl. X.R.

204—3, 38; 264—81